(12) United States Patent
Voong et al.

(10) Patent No.: US 10,161,566 B2
(45) Date of Patent: Dec. 25, 2018

(54) POWER TOOL WITH CAPACITIVE INJURY MITIGATION SYSTEM

(71) Applicant: Robert Bosch GmbH, Stuttgart (DE)

(72) Inventors: Gary L. Voong, Chicago, IL (US); Robert Lewis Newton, Elgin, IL (US); John Seo, Bolingbrook, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 201 days.

(21) Appl. No.: 15/037,258

(22) PCT Filed: Nov. 11, 2014

(86) PCT No.: PCT/US2014/064950
§ 371 (c)(1),
(2) Date: May 17, 2016

(87) PCT Pub. No.: WO2015/073405
PCT Pub. Date: May 21, 2015

(65) Prior Publication Data
US 2016/0273708 A1    Sep. 22, 2016

Related U.S. Application Data

(60) Provisional application No. 61/905,726, filed on Nov. 18, 2013.

(51) Int. Cl.
*F16P 3/14* (2006.01)
*G05B 9/02* (2006.01)
*B23D 59/00* (2006.01)

(52) U.S. Cl.
CPC ............ *F16P 3/148* (2013.01); *B23D 59/001* (2013.01); *G05B 9/02* (2013.01)

(58) Field of Classification Search
CPC ............ F16P 3/148; G05B 9/02; B23D 59/001
See application file for complete search history.

(56) References Cited

U.S. PATENT DOCUMENTS 6,418,829 B1    7/2002    Pilchowski
7,020,970 B1    4/2006    Welch
(Continued)

FOREIGN PATENT DOCUMENTS

| DE | 102006041756 A1 | 3/2008 |
|----|-----------------|--------|
| WO | 2010/059786 A1  | 5/2010 |
| WO | 2014160283 A1   | 10/2014 |

OTHER PUBLICATIONS

International Search Report corresponding to PCT Application No. PCT/US2014/064950, dated Apr. 22, 2015 (3 pages).
(Continued)

*Primary Examiner* — Tri Hoang
(74) *Attorney, Agent, or Firm* — Maginot Moore & Beck LLP

(57) ABSTRACT

In one embodiment, a power tool includes a cutting assembly, a sensor system proximate to the cutting assembly, a reaction system operably connected to the cutting assembly, a memory, program instructions stored within the memory, a spatial recognition algorithm stored within the memory, and a processor operably connected to the reaction system, the sensor system, and the memory. The processor is configured to execute the program instructions to detect a man profile within a detection zone associated with the cutting assembly, establish a location of the human profile within the detection zone based upon the detection using the spatial recognition algorithm, determine that an unsafe condition exists based upon the established location, and activate the reaction system.

15 Claims, 8 Drawing Sheets

(56) References Cited

U.S. PATENT DOCUMENTS

| | | | | |
|---|---|---|---|---|
| 7,707,920 | B2* | 5/2010 | Gass | B23D 45/067 |
| | | | | 83/781 |
| 8,919,231 | B2* | 12/2014 | Butler | B27B 5/222 |
| | | | | 83/397.1 |
| 2004/0226800 | A1 | 11/2004 | Pierga et al. | |
| 2011/0048197 | A1 | 3/2011 | Winkler | |
| 2012/0186699 | A1 | 7/2012 | Gass | |
| 2014/0260845 | A1* | 9/2014 | Voong | B27B 5/38 |
| | | | | 83/13 |
| 2014/0260846 | A1* | 9/2014 | Voong | B26D 7/24 |
| | | | | 83/13 |

OTHER PUBLICATIONS

Supplementary European Search Report corresponding to European Patent Application No. 14 86 2022 (10 pages).

Hess, Kevin, "Mouser has the New Silicon Labs C8051F98x / C8051F99x Microcontrollers in Stock!", Mouser Electronics, Inc., press release, Jul. 1, 2010 (3 pages).

* cited by examiner

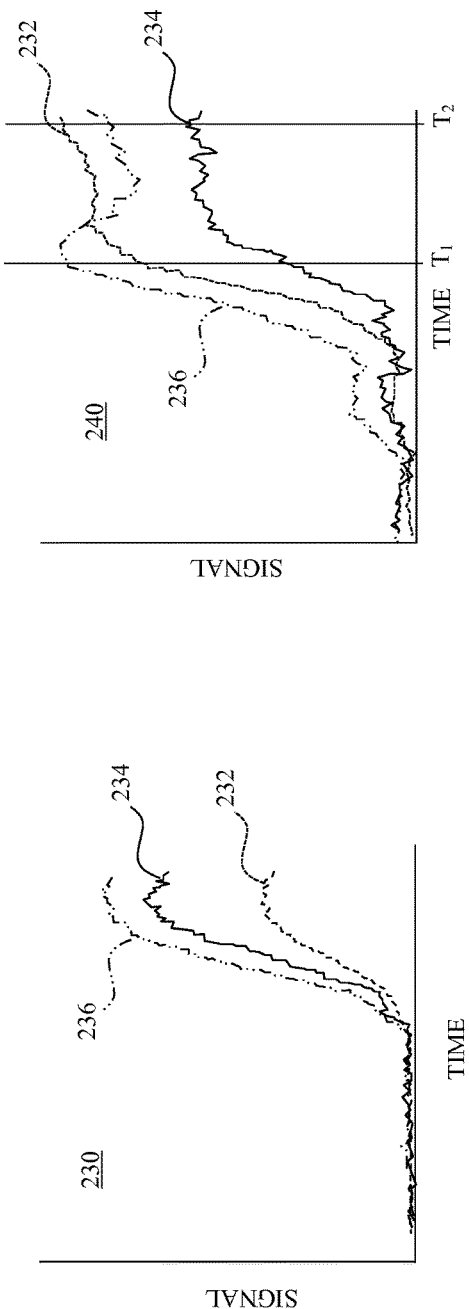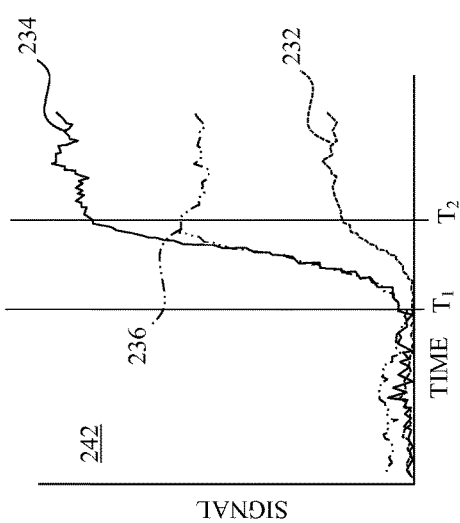

POWER TOOL WITH CAPACITIVE INJURY MITIGATION SYSTEM

CROSS REFERENCE

This application is a 35 U.S.C. § 371 National Stage Application of PCT/US2014/064950, filed on Nov. 11, 2014, which claims the benefit of priority to U.S. Provisional Application No. 61/905,726 filed Nov. 18, 2013, the entire contents of which are herein incorporated by reference.

FIELD

This disclosure relates to power tools which include protective systems configured to rapidly stop movement of a shaping device.

BACKGROUND

A number of power tools have been produced to facilitate forming a work piece into a desired shape. One such power tool is a miter saw. Miter saws present a safety concern because the saw blade of the miter saw is typically very sharp and moving at a high rate of speed. Accordingly, severe injury such as severed digits and deep lacerations can occur almost instantaneously. A number of different safety systems have been developed for miter saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, a user's finger is nonetheless in proximity to the moving blade, particularly when attempting to secure a work piece as the miter saw is used to shape the work piece.

Miter saw safety systems have been developed which are intended to stop the blade when a user's hand approaches or touches the blade. Various stopping devices have been developed including braking devices which are physically inserted into the teeth of the blade. In general, upon detection of a person in the vicinity of the blade, a signal is processed and sent to a reaction system such as a brake mechanism to stop blade rotation within a short period of time. One such system is disclosed in U.S. Patent Publication No. 2011/0048197. In other systems, reaction systems incorporate a mechanical or electrical brake. Pyrotechnic firing is also used in some reaction systems to force a moving blade or other shaping device, initially extending through a slot or hole in a table, underneath the table.

In all of these systems, the ability to place the system into a safe condition is predicated upon timely sensing that an unsafe condition exists. The sensitivity of a sensing system must therefore be sufficient to minimize risk of injury. If the system is too sensitive, however, then the tool will be placed into safe condition when there is actually no danger to a user. Such inadvertent activations of the injury mitigation system can be very inconvenient and, in some systems, costly.

What is needed therefore is a simple and reliable configuration which reduces the potential for inadvertent activations of an injury mitigation system while providing increased sensitivity to unsafe conditions.

SUMMARY

In one embodiment, a power tool includes a cutting assembly, a sensor system proximate to the cutting assembly, a reaction system operably connected to the cutting assembly, a memory, program instructions stored within the memory, a spatial recognition algorithm stored within the memory, and a processor operably connected to the reaction system, the sensor system, and the memory. The processor is configured to execute the program instructions to detect a human profile within a detection zone associated with the cutting assembly, establish a location of the human profile within the detection zone based upon the detection using the spatial recognition algorithm, determine that an unsafe condition exists based upon the established location, and activate the reaction system.

In one or more embodiments, the sensor system includes a capacitive sensing chip and one or more receivers, and the processor is further configured to execute the program instructions to obtain a respective signal from each of the one or more receivers, and establishing the location of the human profile includes establishing the location of the human profile based upon the respective signals.

In one or more embodiments the processor is configured to execute the program instructions to establish a location of the human profile within the detection zone relative to a moving component of the cutting assembly based upon the detection.

In one or more embodiments the moving component comprises a blade, and the capacitive sensing chip is operatively connected to the blade such that a signal of the capacitive sensing chip is transmitted by the blade.

In one or more embodiments the processor is configured to execute the program instructions to determine that the unsafe condition exists based upon a determined speed and direction of movement of the human profile.

In one or more embodiments the processor is configured to execute the program instructions to define a danger zone with respect to the blade, and determine that the unsafe condition exists based upon the established location and the danger zone.

In one or more embodiments the processor is configured to execute the program instructions to define the danger zone based upon a determined position of the blade.

In one or more embodiments the processor is configured to execute the program instructions to define the danger zone based upon a determined position of a blade guard located about a portion of the blade.

In one or more embodiments the one or more receivers includes a first receiver located proximate a forward portion of the blade, a second receiver located anteriorly of the first receiver and proximate a first side of the blade, and a third receiver located anteriorly of the first receiver and proximate a second side of the blade, the second side opposite to the first side.

In one or more embodiments the one or more receivers includes a fourth receiver located proximate an anterior portion of the blade, a fifth receiver located forwardly of the fourth receiver and proximate the first side of the blade, and a sixth receiver located forwardly of the fourth receiver and proximate the second side of the blade.

In one or more embodiments the processor is configured to define the danger zone based upon a determined position of a blade guard located about a portion of the blade while the position of the blade guard is being varied.

In another embodiment, a method of operating a power tool includes detecting human profile within a detection zone associated with a cutting assembly of the power tool with a sensor system, establishing a location of the human profile within the detection zone based upon the detection by applying with a processor a spatial recognition algorithm stored within a memory, determining with the processor that an unsafe condition exists based upon the established location, and activating with the processor a reaction system to mitigate the unsafe condition.

In one or more embodiments detecting human profile comprises detecting the human profile using a capacitive sensing chip, and a plurality of receivers, and establishing the location of the human profile includes establishing the location of the human profile using a plurality of signals received by the processor from the one or more of receivers.

In one or more embodiments establishing the location of the human profile includes establishing the location of the human profile relative to a moving component of the cutting assembly using the plurality of signals.

In one or more embodiments a method includes transmitting a signal from a blade of the cutting assembly using the capacitive sensing chip.

In one or more embodiments determining with the processor that an unsafe condition exists includes determining with the processor that an unsafe condition exists based upon a determined speed and direction of movement of the human profile.

In one or more embodiments a method includes determining a position of the blade using the processor, and defining a danger zone, by executing with the processor program instructions stored within the memory, using the determined position of the blade, wherein determining with the processor that an unsafe condition exists comprises determining with the processor that an unsafe condition exists based upon the defined danger zone.

In one or more embodiments defining the danger zone includes defining the danger zone based upon a determined position of a blade guard located about a portion of the blade.

In one or more embodiments establishing the location of the human profile includes analyzing a first of the plurality of signals received from a first of the plurality of receivers located proximate a forward portion of the blade, analyzing a second of the plurality of signals received from a second of the plurality of receivers located anteriorly of the first receiver and proximate a first side of the blade, and analyzing a third of the plurality of signals received from a third of the plurality of receivers located anteriorly of the first receiver and proximate a second side of the blade, the second side opposite to the first side.

In one or more embodiments establishing the location of the flesh includes analyzing a fourth of the plurality of signals received from a fourth of the plurality of receivers located proximate an anterior portion of the blade, analyzing a fifth of the plurality of signals received from a fifth of the plurality of receivers located forwardly of the fourth receiver and proximate the first side of the blade, and analyzing a sixth of the plurality of signals received from a sixth of the plurality of receivers located forwardly of the fourth receiver and proximate the second side of the blade.

BRIEF DESCRIPTION OF THE DRAWINGS

FIGS. 6-8 depict the output of some of the sensors of FIG. 4 as a user moves a hand about the miter saw assembly of FIG. 1;

DESCRIPTION

Figure 1:
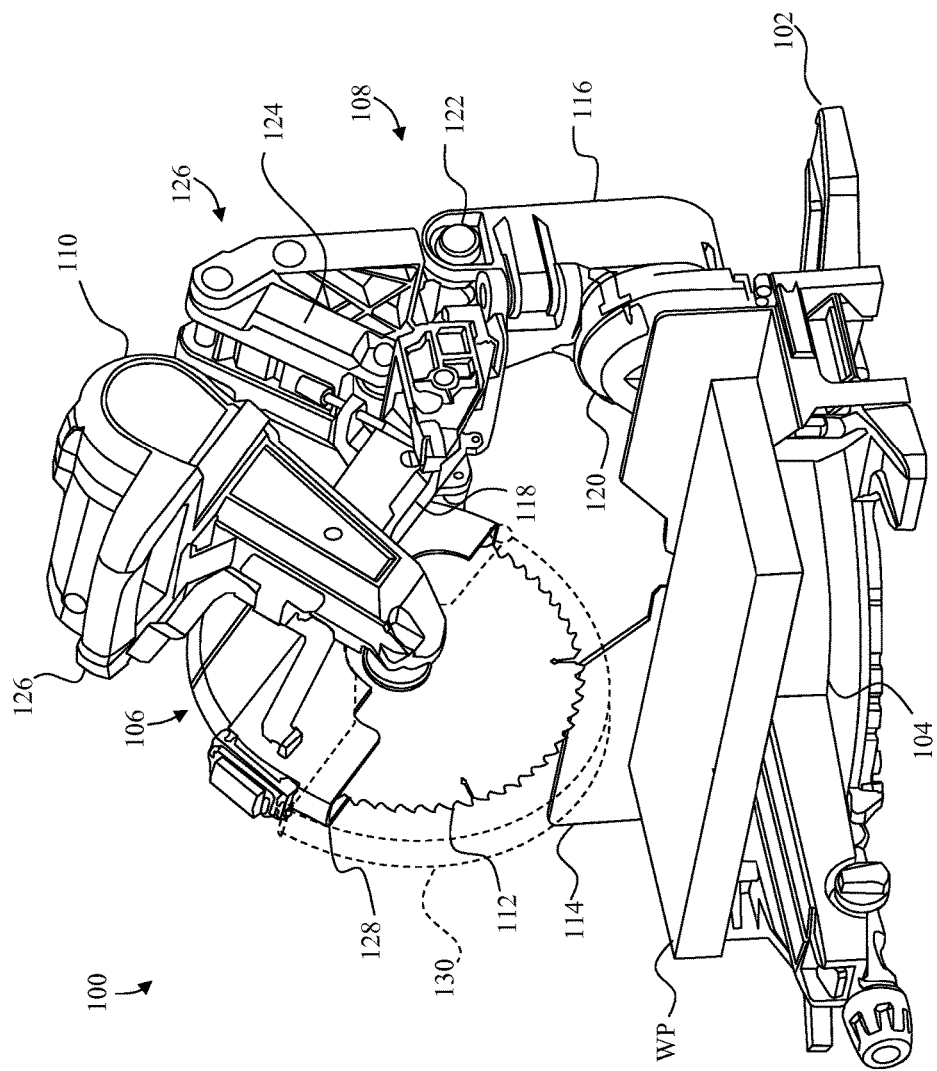
FIG. 1 depicts a front right perspective view of a miter saw assembly.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Referring now to FIG. 1, there is a power tool in the form of a miter saw assembly 100 is illustrated. Other types of power tool such as a table saw, a sliding miter, a drop saw, a compound saw, a circular saw, a woodworking saw, or the like are possible. The miter saw assembly 100 includes a base 102 and a turntable 104 that is rotatable on the base 102. The miter saw assembly 100 further includes a cutting head 106 mounted on a cutting head support assembly 108. The cutting head 106 (which may also be referred to herein as a "cutting assembly") includes a motor 110 that is operable to rotate a circular saw blade 112. The cutting head support assembly 108 is attached to the turntable 104 and configured to support the cutting head 106 such that the cutting head 106 may move over the turntable 104 and perform cutting operations on a work piece (WP) supported by the turntable 104. A guide fence 114 attached to the base 102 may be used to align the work piece WP thereon.

Figure 2:
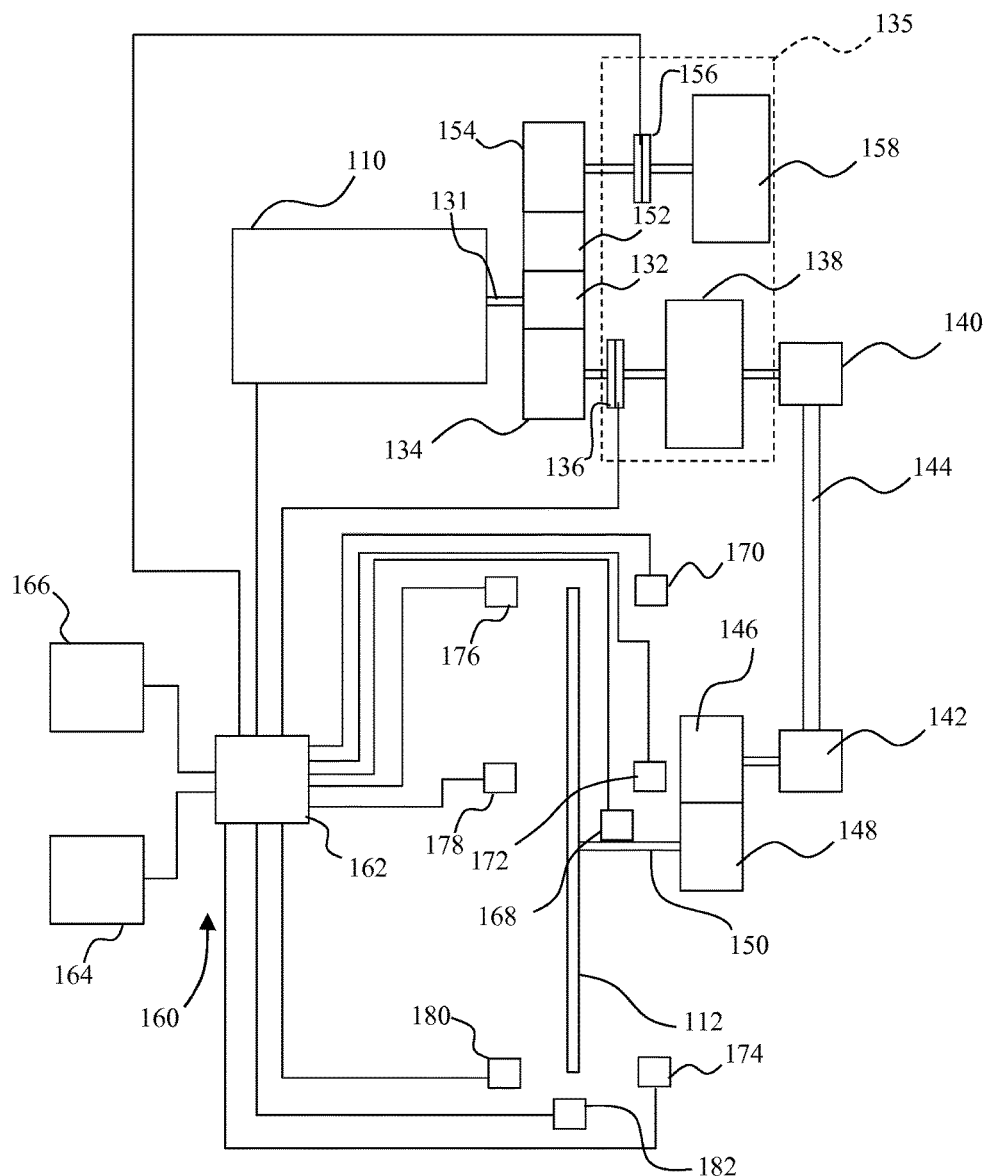
FIG. 2 depicts a schematic diagram of the power transfer train between the motor and the blade including a safety circuit in a mutual capacitance configuration which controls a reaction system.

The cutting head support assembly 108 includes a bevel arm 116, a cutting arm 118, a first pivot mechanism 120, and a second pivot mechanism 122. The bevel arm 116 (also referred to herein as a "bevel post") provides a bevel support structure for the miter saw assembly 100. The bevel arm 116 is pivotally attached to the turntable 104 by the first pivot mechanism 120. The first pivot mechanism 120 includes a hinge arrangement that enables the bevel arm 116 of the support assembly 108 to pivot with respect to the turntable 104 during a setup procedure. In particular, this arrangement is configured to enable the bevel arm 116 to pivot from a vertical position (as shown in FIGS. 1-2) to an angle of 45° (not shown) or more in the leftward direction or rightward direction prior to a cutting operation. This pivoting allows the blade 112 of the cutting assembly 106 to approach the table 104 from a bevel angle and perform angled cuts on a work piece supported on the table 104, as is well known in the art.

The cutting arm 118 of the support assembly 108 provides a support for the cutting assembly 106. The cutting arm 118 is pivotally connected to a hinge 124 via a pivot 126. The pivot 126 enables pivoting movement of the cutting assembly 106 in relation to the turntable 104 and the base 102 during a cutting operation. This pivoting allows the blade 112 of the cutting assembly 106 to move toward and away from the horizontal turntable 104 to perform a cutting operation. In other embodiments, the cutting arm 118 may be mounted to the hinge 124 component and the hinge 124 component is mounted on rails (slide miter saws). Another configuration is for the cutting arm 118 to be mounted on directly on bevel arm 116 with pivot at second pivot 122 (chop saw—non sliding or gliding miter saws).

The cutting assembly 106 includes a handle 126 connected to the cutting arm 118 to facilitate movement of the cutting assembly 106 in relation to the turntable 104. The handle 126 is designed and dimensioned to be grasped by a human hand when performing a cutting operation. This allows the user to easily pivot the cutting assembly 106. A switch (not shown) may be provided on the handle 126 to allow the user to easily energize and de-energize the electric motor 110 during a cutting operation. A blade guard 128 covers the top portion of the circular saw blade 112. A lower blade guard 130, shown in shadow for purpose of clarity, is rotatably mounted to the cutting head assembly 106. The lower blade guard 130 is configured to rotate in a clockwise direction with respect to the cutting head assembly 106, in the view of FIG. 1, when the cutting head assembly 106 is pivoted toward the turntable 104 thereby exposing the circular saw blade 112.

Figure 3:
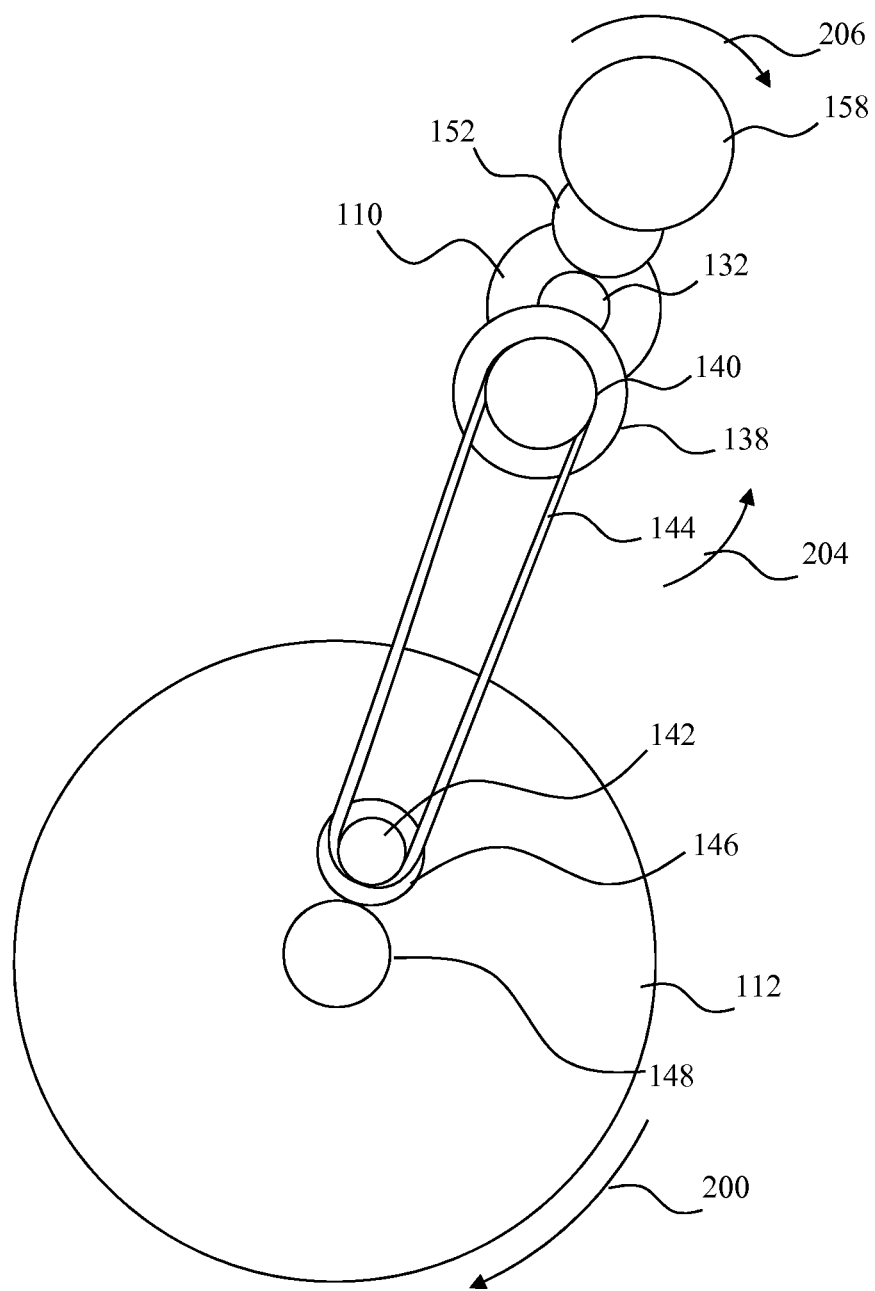
FIG. 3 depicts a simplified plan view of the right side of the power transfer train.

The connection between the motor 110 and the saw blade 112 is further described with reference to FIGS. 2 and 3. The motor 110 has an output shaft 131 which drives a pinion gear 132. The pinion gear 132 is operably connected to a gear 134 that drives a clutch/brake assembly 135. The clutch/brake assembly 135 includes a primary clutch 136 which connects the gear 134 to a primary braking assembly 138. The primary braking assembly 138 in one embodiment is the braking assembly described in U.S. Patent Application Publication No. 2011/0048197, the entire contents of which are herein incorporated by reference.

The primary braking assembly 138 drives a pulley 140 which is operably connected to a pulley 142 by a belt 144. In some embodiments, the pulley system is replaced by a geared drive system. The pulley 142 is operably connected to a gear 146 which drives a gear 148 operably connected to a drive shaft 150 on which the blade 112 is mounted. The motor 110, along with the gears and pulleys, are configured such that the blade 112 rotates downwardly.

The pinion gear 132 is also connected to a reversing gear 152. The reversing gear 152 drives a gear 154 that drives a secondary clutch 156 which in turn is connected to a secondary brake 158. The secondary brake 158 is operatively connected to the hinge 124.

Figure 4:
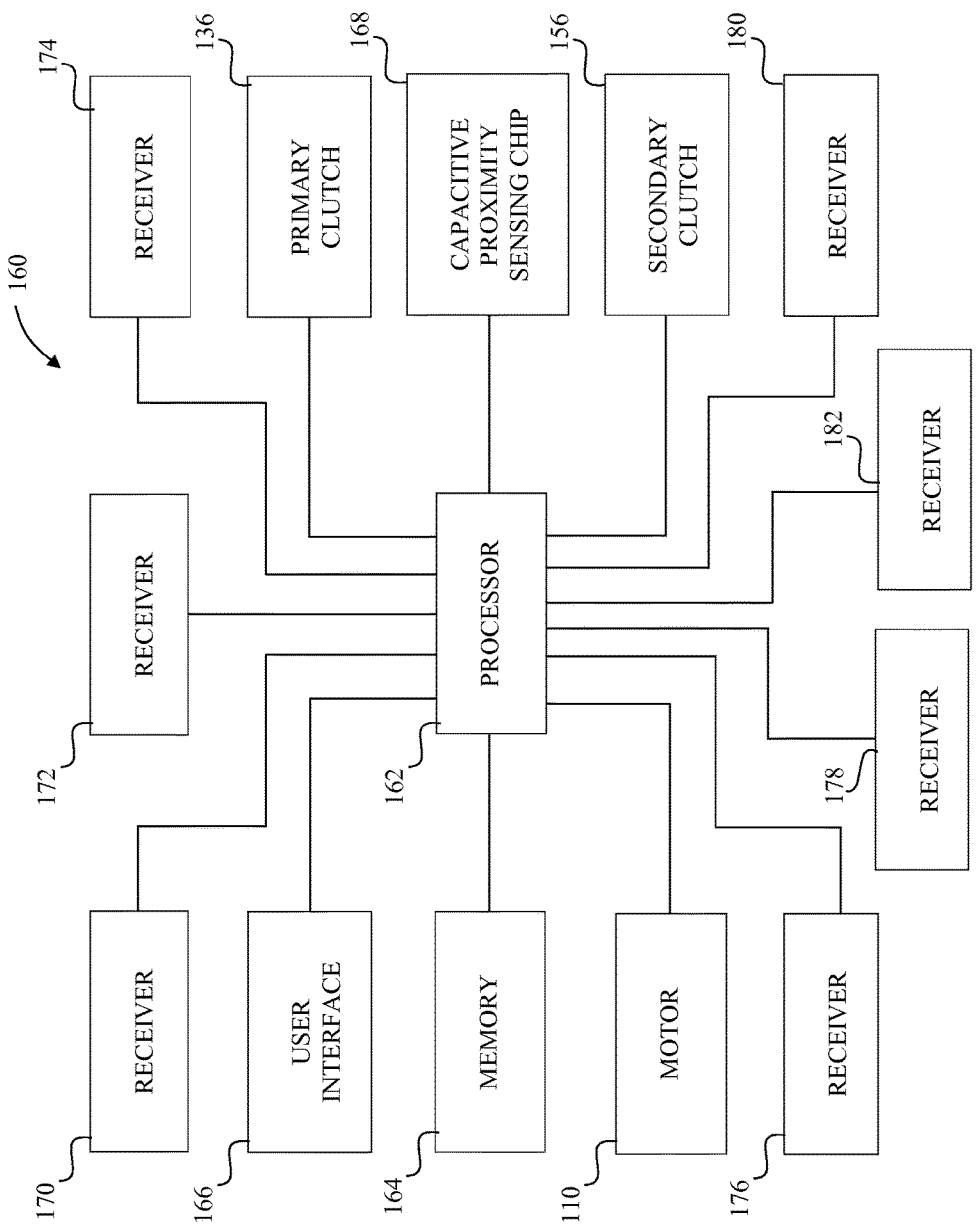
FIG. 4 depicts a schematic of the safety circuit of FIG. 2.

FIG. 2 further shows a safety circuit 160 that is used to sense unsafe conditions and control various components of the miter saw assembly 100 in response to such conditions. The safety circuit 160, also shown in FIG. 4, includes a processor 162 which is operably connected to the motor 110, the primary clutch 136, and the secondary clutch 156. The processor 162 is further operably connected to a memory 164, a user interface 166, a capacitive sensing chip 168, and a receiver, a plurality of receivers 170, 172, 174, 176, 178, 180, and 182 are illustrated.

The processor 162 is implemented as desired such as with one or more general or specialized programmable processors that execute programmed instructions which are stored in the memory 164 as discussed in further detail below. The processor 162, memory 164, and interface circuitry can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

While only one capacitive sensing chip 168 is shown, more may be provided. The capacitive sensing chip 168 is a capacitive or capacitive proximity sensor which is driven by one or more proximity sensing chips (self-capacitance or mutual capacitance) such as those from Silicon Labs (C8051F7xx, C8051F8xx, C8051F9xx, and similar chips not listed), Microchip (GestIC, all the general purpose mTouch MCUs, and similar chips not listed), Atmel (QTouch/QTouchADC, QMatrix, and similar chips not listed), or another similar chip. The capacitive sensing chip 168 in the embodiment of FIG. 2 is a mutual capacitance configuration. Accordingly, the capacitive sensing chip 168 is configured such that the signal is on the blade 112 with the blade 112 being electrically isolated from the rest of the tool, which allows the blade 112 to act as a transmitter. In other embodiments, the capacitive sensing chip 168 is configured such that another component of the miter saw 100 is the transmitter such as the upper guard, fence, or table top.

In some embodiments, proximity sensing is integrated into processors such as ARM-based architecture processors or any other desired form. In some embodiments, more than one microcontroller is used to drive one or more capacitive proximity sensing chips. In some embodiments, one or more microcontroller(s) drive a combination of capacitive proximity sensing chip(s) and other sensing systems (e.g. NIR, UWB, IR, etc.). In some embodiments, one or more microcontroller(s) drive a combination of ARM-based processors and other sensing systems (e.g. NIR, UWB, IR, etc.).

The capacitive proximity sensing chip is operably connected to the blade 112 (or other moving part of other systems) while the receivers 170-182 are positioned about the blade 112. FIG. 2, for example, depicts the receiver 170 at the rear right side of the blade 112, the receiver 172 at the middle right side of the blade 112, the receiver 174 at the front right side of the blade 112, the receiver 176 at the rear left side of the blade 112, the receiver 178 at the middle left side of the blade 112, the receiver 180 at the front left side of the blade 112, and the receiver 182 at the front of the blade 112. The receivers in one embodiment are mounted on the blade guard 128, either on the outside or inside of the blade guard 128. In other embodiments, more or fewer receivers are used. While a single receiver may be used, the incorporation of multiple receivers provides for redundancy and, for some algorithms, increased accuracy. Additionally, the actual mounting location of the receivers is varied if desired. For example, the receivers in some embodiments are mounted on one or more of the upper guard, table, fences, and/or kerf plate.

Moreover, in some embodiments the safety circuit 160 is incorporated into a table saw. In such embodiments, the transmitter and receiver pairs can be configured using the blade, tuning fork, table, kerf plate, riving knife, undercarriage, and/or guard. The selection of the component used as a transmitter will thus vary, with receivers being placed on one or more of the other components.

In some embodiments the safety circuit 160 is incorporated into a circular saw. In such embodiments, the transmitter and receiver pairs can be configured using the blade, fixed guard, movable guard, and/or foot plate. The selection of the component used as a transmitter will thus vary, with receivers being placed on one or more of the other components.

Figure 5:
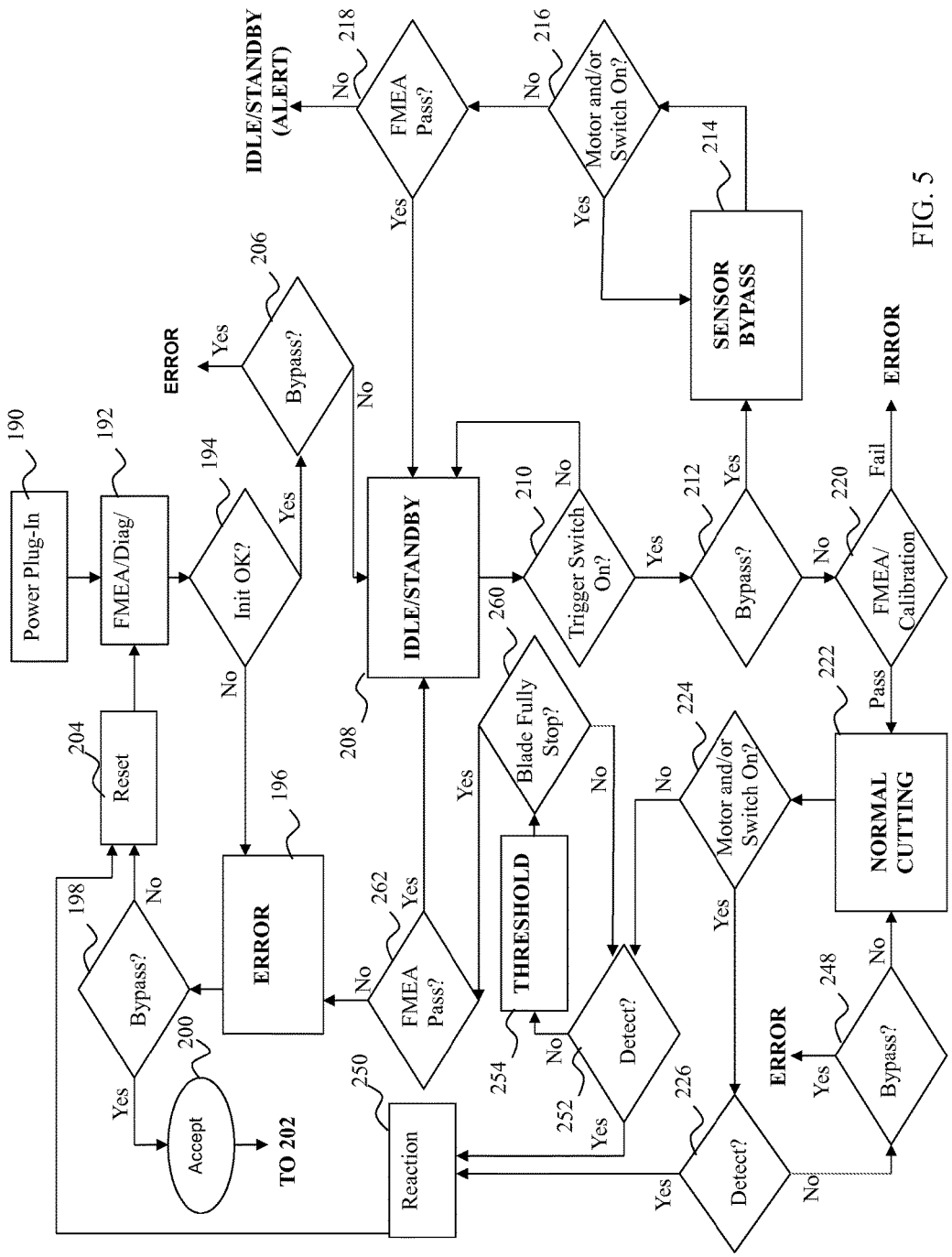
FIG. 5 depicts a flow diagram of a process performed by the processor of FIG. 4 to provide injury mitigation using capacitive sensing and spatial recognition.

Operation of the safety circuit 160 is described with further reference to FIG. 5. When power is initially provided to the safety circuit 160 (block 190), the processor 162 executes program instructions stored in the memory 164 to perform a diagnostic/calibration of the system (block 192). The safety circuit in some embodiments is further configured to perform availability/operability testing on the primary and secondary braking systems during failure mode and effects analysis (FMEA) at block 192. Functional monitoring of sensor(s) includes performing FMEA by scanning through one or more sensors to ensure proper function. In the event of a fault detection of the primary braking system and/or secondary braking system, the safety circuit in some embodiments disables the saw from operating. In other embodiments, in the event of a fault detection of the primary braking system, the safety circuit in some embodiments disables the secondary braking assembly and the saw from operating.

If at block 194 the diagnostic/calibration is not successful, an error message is generated (block 196) and the system checks to see if the safety circuit 160 is in bypass mode (block 198). If the system is in bypass mode, then the condition is accepted (block 200), and the system proceeds to an idle/standby condition (block 202).

If at block 198 the system is not in bypass, a reset signal is generated (block 204) and the procedure returns to block 192.

Returning to block 194, if the diagnostic/calibration procedure is completed successfully, the procedure continues to block 206. If at block 206 the safety circuit 160 is in bypass mode, an error message is generated since there is no reason to bypass the safety circuit 160. If at block 206 the safety circuit 160 is not in bypass mode, the process continues to the idle/standby condition (block 208).

Once the system is in an idle/standby condition (block 208), the processor 162 at block 210 checks the condition of the trigger switch (not shown) which is typically located in the handle 126. If the trigger switch is not in an "ON" position, the procedure returns to the idle/standby condition (block 208).

If at block 210 the trigger switch is in the "ON" position, the processor 162 checks if the safety circuit 160 is in bypass mode (block 212). If the safety circuit 160 is in bypass mode then the sensor inputs are bypassed (block 214) and the processor 162 verifies that the motor 110 is energized and the trigger switch is in the "ON" position (block 216). If the motor 110 is energized and the trigger switch is in the "ON" position the procedure continues to block 214. If either the motor 110 is de-energized or the trigger switch is not in the "ON" position at block 216, the procedure continues to block 218 and FMEA is performed. If the FMEA passes at block 218, the system returns to idle/standby at block 208. If the FMEA does not pass at block 218, then the process continues to idle/standby at block 208 and an alert is provided to the user of the results of the FMEA.

Returning to block 212, if the system is not in bypass, mode, then the procedure continues to block 220 and an FMEA/calibration is performed. If the FMEA/calibration procedure fails, an error message is generated and the process terminates. If the FMEA/calibration procedure passes, then normal cutting is effected at block 222. At block 224, the processor 162 verifies that the motor 110 is energized and the trigger switch is in the "ON" position at block 224. So long as those conditions exist, the process proceeds to block 226 and the processor 162 checks for an unsafe condition.

An "unsafe" condition exists if the signals received from the receivers 170-182 singly or jointly exceed a threshold stored in the memory 164. The threshold is explained with reference to FIGS. 6-8. FIG. 6 depicts a chart 230 of the output from the receivers 174, 180, and 182. The output of the receiver 174 is indicated by the line 232, the output of the receiver 180 is indicated by the line 234, and the output of the receiver 182 is indicated by the line 236. Increase in signal strength above a noise level indicates that a human profile such as flesh, finger, arm, elbow, hand, or any part of human body portion has been detected within a detection zone about the cutting assembly. The detection zone is the combination of detection areas associated with each of the sensor devices which in this embodiment are receivers. By analyzing the signals, the specific location of the human profile within the detection zone can be determined.

For example, the chart 230 was generated by moving the hand of an individual near the front left portion of the blade 112. Because the hand was closest to the receiver 182, the receiver 182 generated the largest signal (line 236). Because the hand was closer to the receiver 180 than the receiver 174, the receiver 180 generated the next largest signal (line 234).

The chart 240 in FIG. 7 shows the same receiver outputs depicted in FIG. 6, but chart 240 was generated by moving the hand of an individual near the front right portion of the blade 112. Because of the hand was closest to the receiver 174 at time $T_2$, the receiver 174 generated the largest signal (line 232). Because the hand was closer to the receiver 182 than the receiver 180, the receiver 182 generated the next largest signal (line 236). Chart 240 further indicates that at time $T_1$, the hand was actually closer to the receiver 182 (line 236) than the receiver 174 (line 232). Thus, by analyzing the signal outputs, the position of the hand relative to the receivers can be tracked.

Chart 242 in FIG. 8 shows the same receiver outputs depicted in FIG. 6, but chart 242 was generated by moving the hand of an individual near the front left portion of the blade 112. Because the hand was closest to the receiver 180 after time $T_2$, the receiver 180 generated the largest signal (line 234). Because the hand was closer to the receiver 182 than the receiver 180, the receiver 182 generated the next largest signal (line 236). Chart 240 further indicates that between the time $T_1$ and $T_2$, the hand was moving toward the blade 112, but primarily toward the front left side of the blade 112 since all of the receivers produced an increased signal, but the rate of change of the signals from receivers 180 and 182 (lines 234 and 236, respectively) was greater than the rate of change from the receiver 174 (line 232).

Therefore, by storing a desired algorithm in the memory 164, the output of the receivers 170-182 can be analyzed to ascertain a relative position, speed, and direction of movement of the hand. Consequently, by selecting the desired location and configuration of the components in the safety circuit 160, the safety circuit can be configured to define a danger zone with a desired shape and sensitivity. For example, in the embodiment of FIG. 1, a hand which is close to the portion of the blade 112 which is covered by the blade guard 128 is less likely to be injured than a hand which is located close to the portion of the blade 112 which is exposed or covered by the lower blade guard 130. The safety circuit 160 thus provides spatial recognition which, using a spatial recognition algorithm stored in the memory 164, is better able to identify an unsafe condition based upon the determined location of the hand with reference to the blade 112 or other moving component of the cutting assembly and the speed of movement of the hand. The "threshold" is thus the boundary of the three dimensional danger zone, the shape of which in some embodiments reflects the relative danger of a particular location with respect to a moving component of the cutting assembly.

Returning to FIG. 5, if no unsafe condition is detected (block 226), the processor 162 verifies that the safety system 160 is not in bypass mode (block 248). If the system is not in bypass mode, normal cutting continues at block 222. If the system is in bypass mode at block 248, the motor 110 is de-energized and an error message is generated.

If at block 226 an unsafe condition is detected, the reaction system is activated (block 250). A "reaction system" is a system which is configured to place the cutting assembly in a safe condition, such as by stopping a cutting device or moving the cutting device away from a user. Upon activation of the reaction system, the processor 162 disengages the clutch 136 and activates the primary braking assembly 138 to rapidly stop as discussed in more detail in the '197 Publication.

The safety circuit 160 is further connected to the secondary clutch 156 and the secondary braking assembly 158. Upon sensing an unsafe condition, a signal is also sent to an electromagnet in the clutch/brake assembly 135 and the clutch 156 is released and the secondary braking assembly 158 is activated. Trigger timing of the secondary braking assembly 158 can occur simultaneously with that of the primary braking assembly 138 or after a predetermined time. The timing in some embodiments depends on the particular application (e.g., on miter saw or circular saw). In some miter saw applications such as the embodiment of FIG. 1, the trigger timing is also a function of the rotational position of the cutting head 106.

Because the secondary braking assembly 158 works in parallel with the primary braking system 138, a dynamic balancing mechanism is applied to the saw 100. The secondary braking assembly 158 is selected to be similar to the primary braking system 138 to reduce destructive energy generated from the primary braking system 138. The two braking components are sized accordingly as discussed in U.S. Application No. 61/781,931 filed on Mar. 14, 2013, the entire contents of which are herein incorporated by reference.

After activation of the reaction system at block 250, the procedure continues at block 204.

Returning to block 224, if either the motor 110 is de-energized or the trigger switch is not in the "ON" position, the procedure continues to block 252 and the processor 162 checks for an unsafe condition. If an unsafe condition exists, the procedure continues to block 250. If no unsafe condition exists at block 252, the procedure continues to block 254 and a threshold calibration is performed.

Figure 9:
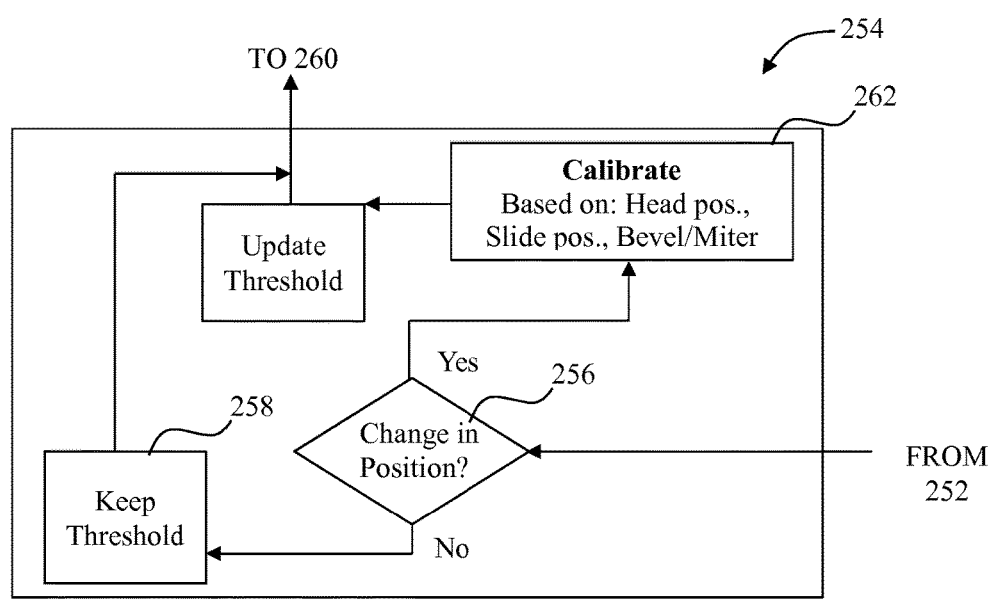
FIG. 9 depicts a flow diagram of a calibration process performed by the processor of FIG. 4 to modify thresholds based upon movement of components of the miter saw assembly of FIG. 1.

The threshold calibration is depicted in further detail in FIG. 9. At block 256 of the threshold calibration, the processor 162 determines if there has been a change in position of any portion of the miter saw assembly 100. If there has been no change, then the same thresholds for defining an unsafe condition are maintained (block 258) and the procedure continues to block 260 of FIG. 5. If some portion of the miter saw assembly 100 has changed, then the processor 162 executes the algorithm in the memory 164 to establish new thresholds (block 262).

For example, if a lower guard has moved, then areas of the blade formerly covered by the guard are now exposed. Accordingly, a hand which would previously have been considered to be in a safe zone, i.e., outside of a danger zone, is now in a danger zone. Likewise, changing the relative position of the blade 112 by pivoting of the cutting head 106 or movement along a slide would change the danger zone. This is particularly true in embodiments wherein one or more of the receivers or other components of the safety circuit 160 are not located in fixed relationship with respect to the blade 112.

Once new thresholds have been generated at block 262, the thresholds stored in the memory 164 are updated and the procedure continues to block 260 of FIG. 5. It is to be noted that while threshold calibration has been described with respect to block 254 of FIG. 5, the same calibration occurs in some embodiments in block 222, i.e., during normal cutting operations.

Returning to FIG. 5, once the threshold calibration is completed, the processor 162 checks to see if the blade 112 is fully stopped at bock 260. If the blade is not fully stopped, the procedure continues to monitor for an unsafe condition at block 252.

If at block 260 the blade is fully stopped, the procedure continues at block 262 and a FMEA is performed. If the FMEA fails, the procedure continues to block 196. If the FMEA at block 262 passes, the procedure continues to block 202.

The foregoing procedures can be modified in various manners for particular applications. Thus, in some embodiments a baseline threshold is established from a predetermined proximity zone of the blade and is defined without blade movements, such as at block 192. In some embodiments the sensors are calibrated at power up and are recalibrated to compensate for blade movement (i.e. ground affects) at each small time interval. Ground components are any part of the tool (table/base/fence/foot plate, etc.) that affects the sensor's capacitance reading as the blade changes position (miter, bevel, head up/down, etc.).

In some embodiments, the dangerous area is a zone defined as a perimeter about the front, left, right, and/or rear of the cutting blade. The perimeter in some embodiments is not a uniform perimeter. Flesh or human profile detection, i.e., determination of an unsafe condition, is accomplished through a change in capacitance level upon touch or proximity. In other words, flesh detection is achieved when a hand is in contact with the blade or is within the dangerous area (the predetermined proximity zone of the blade).

The capacitance level at which the reaction system reacts is defined as a threshold level and is determined through experimental testing and a recognition algorithm. A "recognition algorithm" as that term is used herein means a program with defined ground compensated threshold and operating logic. Operating logic includes but is not limited to auto reset, auto threshold calibration, functional monitoring of sensing and reaction systems, system arming and disarming, monitoring threshold deviation and triggering, a user interface, and a memory storage of events.

In some embodiments, auto reset, auto threshold calibration, functional monitoring of sensing and reaction systems, system arming and disarming, monitoring threshold deviation and triggering, and user interface begin upon insertion of the power cord plug into a power outlet. System arming in some embodiments occurs at the start of motor power switch activation or by manually pushing a button. System disarming in some embodiments occurs if the power plug remains in and the motor power switch remains inactive after predetermined time. System disarming in some embodiments also occurs if functional monitoring detects system fault.

The embodiments include a microcontroller which processes an algorithm to continuously monitor any capacitance level deviation from the threshold and determine to output a stop signal to the reaction system. Some embodiments are configured such that in the event of a power outage while the blade or cutting tool is spinning, the safety system remains active at least until the blade is fully stopped.

While a particular arrangement of sensors was discussed in detail above, in some embodiments the sensors are oriented in any angle from the blade, with parallel to the blade typically defined as 0 degree. Moreover, sensor size and positional location from the blade depend on desired proximity detection range. Typically, the sensors are sized at least 5 mm square with no minimum thickness. Additionally, the sensors may be provided in any geometric shape including squares, rectangles, rolls, and coils. The sensors in particular embodiments can be of an electrical conductor in a straight form, various patterns, or loops.

In some embodiments, capacitors external to the proximity sensing chip are configured in series or parallel to the sensor to increase gain and sensitivity as required depending on the sensing chip selected. Typically, the electronic board is grounded to the tool to reduce signal cross-talk and prevent any aluminum components of the tool from acting as sensors.

In some embodiments, a signal on the blade is achieved with an electrical connection to one or more fixed and/or rotating bearing members (bearing outer race and/or inner race) that make contact with the rotating shaft which the blade is attached to. In other embodiments, a signal on the blade is induced with an isolated fixed plate such as a capacitive coupling plate (CCP) configured parallel to the blade.

In some embodiments, signal carrying wire(s) are actively shielded to prevent external influences such as ground, noise, moving components, hands, etc. from introducing errors into the signals. Active shielding is achieved by splitting a signal through a non-inverting unity gain amplifier (op-amp) in some embodiments.

In some embodiments using proximity sensing, sensors are shielded from ground with active shields to form the desired detection zone associated with the particular cutting assembly. Shields can be electrically isolated from ground components and users' contact.

The safety circuit described herein is used in different embodiments in any desired power equipment including miter saws, table saws, circular saws, band saws, router, drills etc. In each of these embodiments, the safety circuit is tailored for the particular cutting assembly incorporated into the tool. Additionally, the safety circuit described herein is used in different embodiments in wired and battery operated tools.

Figure 10:
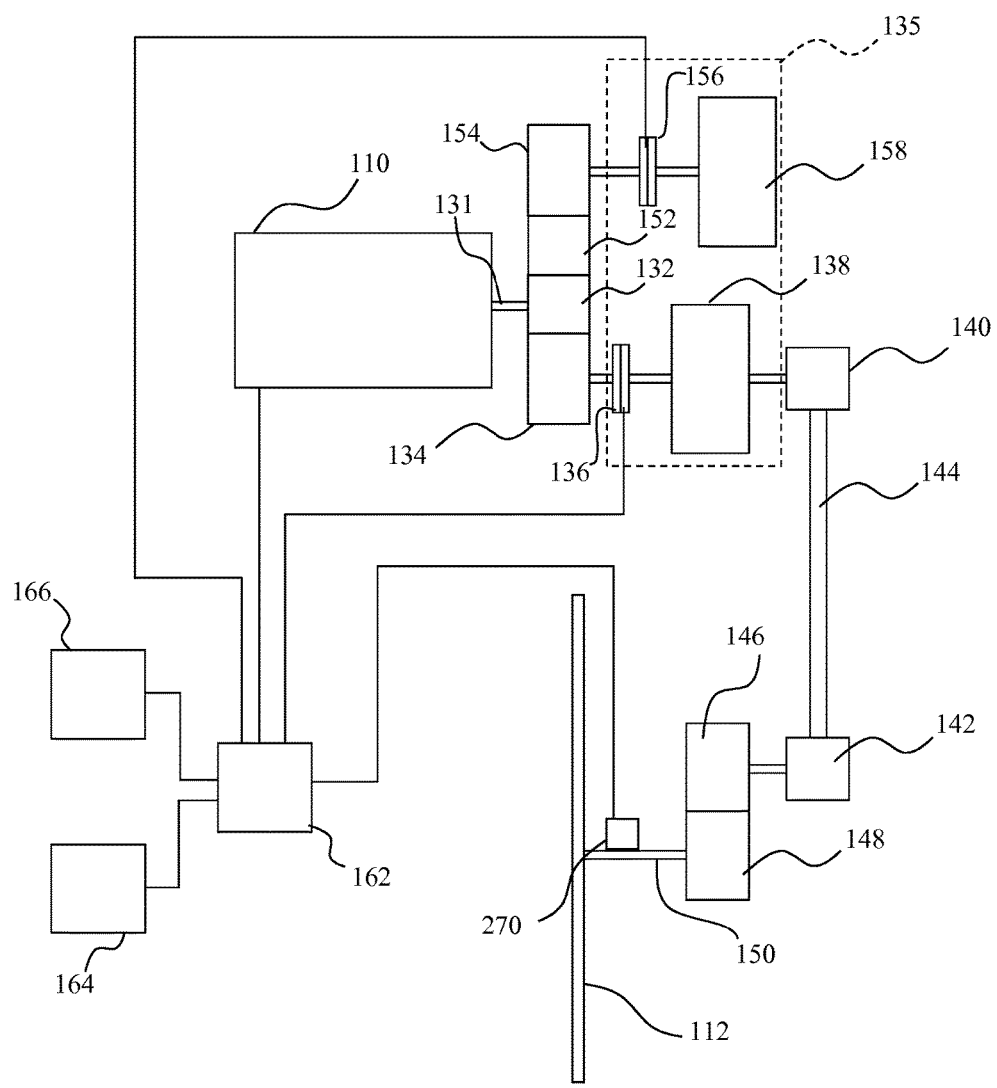
FIG. 10 depicts the schematic diagram of the power transfer train between the motor and the blade of FIG. 2 but including a safety circuit in a self-capacitance configuration which controls the reaction system.

Moreover, while described in the context of a mutual capacitance configuration, the safety system in some embodiments is additionally or alternatively configured in a self-capacitance configuration. In such embodiments, a capacitive or capacitive proximity sensor is configured such that the signal is on the blade with the blade being electrically isolated from the rest of the tool and hence the blade becomes a sensor. Self-capacitance configurations are particularly useful for miter saws, table saws, circular saws, band saws, and any other power tools or power equipment. By way of example, FIG. 10 depicts the miter saw assembly of FIG. 2 wherein the receivers 170-182 and the capacitive sensing chip 168 has been replaced by a capacitive or capacitive proximity sensor 270. In contrast with the capacitive sensing chip 168 which in some embodiments is embodied as a GestIC, QMatrix, or like device, the capacitive proximity sensor 270 is embodied as an mTouch MCU, QTouchADC, or like chip.

In some embodiments, sensor configurations include one or more capacitive or capacitive proximity sensor(s) located on the upper guard, table, and/or kerf plate with or without the blade as the sensor for miter saws. In some embodiments, sensor configurations include one or more capacitive or capacitive proximity sensor(s) located on the tuning fork, table, kerf plate, and/or plastic guard with or without the blade as the sensor for table saws. In some embodiments, sensor configurations include one or more capacitive or capacitive proximity sensor(s) located on the fixed guard, movable guard, and/or foot plate with or without the blade as the sensor for circular saws.

The described embodiments provide a prevention system including a safety circuit, also referred to as a sensing system, and a reaction system. The sensing system when configured on a power tool detects the presence of human flesh within the dangerous area of the tool and activates the reaction system.

By incorporating at least one capacitive or capacitive proximity sensor(s) positioned on a tool, the safety circuit provides spatial recognition through a recognition algorithm. Spatial recognition includes monitoring the position of the blade with respect to ground reference (e.g. table/base/fence/foot plate of miter saws/table saws/circular saws) and adjusting the activation threshold accordingly for flesh sensing. Monitoring of the position of the blade in some embodiments is accomplished through the use of at least one capacitive proximity sensor(s). In some embodiments, one or more encoders, potentiometers, inductive proximity sensors, and or capacitive proximity sensors are used for determining blade position with respect to ground. In some embodiments, the proximity of users to the blade is detected with the same sensors that monitor the position of the blade while in other embodiments separate sensors are used.

The defined safety zone for the safety circuit in some embodiments is based upon the position of the blade which is defined as head up, head down, head up extended or retracted, head down extended or retracted, and any combination of bevel and miter with head up/down for miter saws. Position of blade is defined in some embodiments as varying positions of blade height with respect to the table, and varying positions of blade height in combination with bevel for table saws. The position of blade is defined in some embodiments as varying positions of cutting depth with respect to a foot plate, and varying positions of blade height in combination with bevel for circular saws.

The recognition algorithm provides spatial recognition which in some embodiments determines the position of the user with respect to the blade using one or more receivers and compares the determined position to the adjusted safe zone to determine if a stop signal needs to be sent to the reaction system.

Spatial recognition consists of any desired fixed protection zones to the front, front left, front right, back, back left, back right, bottom, or all positions of the blade. Spatial recognition in some embodiments is configured to detect hand approach speed in addition to hand position in determining if an unsafe condition exists. Spatial recognition thus consists of variable protection zones, i.e., varying threshold, depending on head/blade position (e.g. head up, head down, etc.) and/or hand approach speed to minimize interference with user cutting habits.

The spatial recognition provided by the recognition algorithm can additionally or alternatively incorporate other sensing technologies including, but not limited to, inductive proximity sensors and optical sensors. The spatial recognition provided by the recognition algorithm can be used in trackpads, computer mouse, smart phones, tablets, etc.

The disclosed embodiments thus provide a sensing system utilizing capacitive and capacitive proximity sensing chips with multi-channels, which allow for multiple sensor configurations on a tool for spatial recognition. The embodiments provide multiple channels which allow for various sensor location options for spatial recognition to determine user's position with respect to the dangerous area of the tool. For example on miter saws self-capacitance chips can be configured with the signal on the blade, upper guard, table, and/or kerf plates. Mutual capacitance chips can be configured with the signal on the blade and receivers on the upper guard, table, and/or kerf plates. By incorporating spatial recognition, sensor design using capacitive proximity is enabled without the concern of ground effecting sensing signal. Additionally, variable protection zones are enabled which allows for customization of the protection zone depending on blade position with respect to the table. The disclosed embodiments provide a smaller electronic board design which allows for a more compact design which can be implemented in more applications.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A power tool comprising:
   a cutting assembly;
   a sensor system proximate to the cutting assembly, the sensor system comprising:
      a capacitive sensing chip configured to generate a signal that is transmitted from a first component in the power tool; and
      a plurality of receivers arranged in a plurality of predetermined positions in the power tool that are separate from the first component and configured to detect the transmitted signal;
   a reaction system operably connected to the cutting assembly;
   a memory;
   program instructions stored within the memory; and
   a processor operably connected to the reaction system, the sensor system, and the memory, the processor configured to execute the program instructions to:
      establish a location of a human body part within a detection zone relative to the cutting assembly based upon relative signal strength levels detected by at least two receivers in the plurality of receivers, the relative signal strength levels corresponding to proximity of the human body part to the at least two receivers, and
      activate the reaction system in response to detection of the location of the body part being within a predetermined danger zone around the cutting assembly, the predetermined danger zone being within the detection zone.

2. The power tool of claim 1, wherein the first component in the power tool is one of a blade, a tuning fork, a table, a kerf plate, a riving knife, an undercarriage, a guard, or a foot plate in the power tool.

3. The power tool of claim 2, wherein:
   the first component is the blade that is configured to move during operation of the power tool; and
   the capacitive sensing chip is operatively connected to the blade such that a signal of the capacitive sensing chip is transmitted by the blade.

4. The power tool of claim 3 wherein the processor is further configured to execute the program instructions to:
   establish a first location of the human body part at a first time based upon a first set of relative signal strength levels detected by at least two receivers in the plurality of receivers,
   establish a second location of the human body part at a second time based upon a second set of relative signal strength levels detected by at least two receivers in the plurality of receivers,
   determine at least one of a speed and direction of movement of the human body part based on the first location, the second location, and a difference between the first time and the second time, and
   activate the reaction mechanism in response to determining that an unsafe condition exists based upon at least one of the speed and direction of movement of the human body part.

5. The power tool of claim 3, wherein the processor is configured to execute the program instructions to:
   define the danger zone based upon a determined position of the blade.

6. The power tool of claim 5, wherein the processor is configured to execute the program instructions to:
   define the danger zone based upon a determined position of a blade guard located about a portion of the blade.

7. The power tool of claim 5, wherein the one or more plurality of receivers comprises:
   a first receiver located proximate a forward portion of the blade;
   a second receiver located anteriorly of the first receiver and proximate a first side of the blade; and
   a third receiver located anteriorly of the first receiver and proximate a second side of the blade, the second side opposite to the first side.

8. The power tool of claim 7, wherein the plurality of receivers comprises:
   a fourth receiver located proximate an anterior portion of the blade;
   a fifth receiver located forwardly of the fourth receiver and proximate the first side of the blade; and
   a sixth receiver located forwardly of the fourth receiver and proximate the second side of the blade.

9. The power tool of claim 5, wherein the processor is configured to define the danger zone based upon a determined position of a blade guard located about a portion of the blade while the position of the blade guard is being varied.

10. A method of operating a power tool comprising:
    transmitting, with a capacitive sensing chip, a signal from a first component in the power tool;
    establishing, with a processor operatively connected to a plurality of receivers in the power tool, a location of a human body part within a detection zone associated with a cutting assembly of the power tool based upon relative signal strength levels of the signal from the first component in the power tool detected by at least two receivers in the plurality of receivers, the relative signal strength levels corresponding to proximity of the human body part to the at least two receivers; and activating, with the processor, a reaction system in the power tool in response to detection of the location of the body part being within a predetermined danger zone around the cutting assembly, the predetermined danger zone being within the detection zone.

11. The method of claim 10, further comprising:

transmitting a signal from a blade of the cutting assembly using the capacitive sensing chip.

12. The method of claim 11 further comprising:

establishing, with the processor, a first location of the human body part at a first time based upon a first set of relative signal strength levels detected by at least two receivers in the plurality of receivers, establishing, with the processor, a second location of the human body part at a second time based upon a second set of relative signal strength levels detected by at least two receivers in the plurality of receivers, determining, with the processor, at least one of a speed and direction of movement of the human body part based on the first location, the second location, and a difference between the first time and the second time, and activating, with the processor, the reaction mechanism in response to determining that an unsafe condition exists based upon at least one of the speed and direction of movement of the human body part.

13. The method of claim 10 further comprising:

defining, with the processor, the danger zone based upon a determined position of a blade guard located about a portion of the blade.

14. The method of claim 10, wherein the establishing the location of the human body part further comprises:

analyzing, with the processor, a first of the one or more signals received from a first of the plurality of receivers located proximate a forward portion of the blade;

analyzing, with the processor, a second of the one or more signals received from a second of the plurality of receivers located anteriorly of the first receiver and proximate a first side of the blade; and analyzing, with the processor, a third of the one or more signals received from a third of the plurality of receivers located anteriorly of the first receiver and proximate a second side of the blade, the second side opposite to the first side.

15. The method of claim 14, wherein the establishing the location of the human body part further comprises:

analyzing, with the processor, a fourth of the one or more signals received from a fourth of the plurality of receivers located proximate an anterior portion of the blade;

analyzing, with the processor, a fifth of the one or more signals received from a fifth of the plurality of receivers located forwardly of the fourth receiver and proximate the first side of the blade; and analyzing, with the processor, a sixth of the one or more signals received from a sixth of the plurality of receivers located forwardly of the fourth receiver and proximate the second side of the blade.

* * * * *

UNITED STATES PATENT AND TRADEMARK OFFICE
CERTIFICATE OF CORRECTION

PATENT NO. : 10,161,566 B2
APPLICATION NO. : 15/037258
DATED : December 25, 2018
INVENTOR(S) : Gary L. Voong et al.

It is certified that error appears in the above-identified patent and that said Letters Patent is hereby corrected as shown below:

On the Title Page

Item (57) should read:
In one embodiment, a power tool includes a cutting assembly, a sensor system proximate to the cutting assembly, a reaction system operably connected to the cutting assembly, a memory, program instructions stored within the memory, a spatial recognition algorithm stored within the memory, and a processor operably connected to the reaction system, the sensor system, and the memory. The processor is configured to execute the program instructions to detect a human profile within a detection zone associated with the cutting assembly, establish a location of the human profile within the detection zone based upon the detection using the spatial recognition algorithm, determine that an unsafe condition exists based upon the established location, and activate the reaction system.

In the Claims

In Column 14, Lines 33-34, Lines 1-2 of Claim 7 should read:
7. The power tool of claim 5, wherein the
plurality of receivers comprises:

Signed and Sealed this
Thirtieth Day of April, 2019

Andrei Iancu
*Director of the United States Patent and Trademark Office*